(12) United States Patent
Carrie (10) Patent No.: US 7,693,158 B1
(45) Date of Patent: Apr. 6, 2010

(54) METHODS AND SYSTEMS FOR SELECTIVELY PROCESSING VIRTUAL LOCAL AREA NETWORK (VLAN) TRAFFIC FROM DIFFERENT NETWORKS WHILE ALLOWING FLEXIBLE VLAN IDENTIFIER ASSIGNMENT

(75) Inventor: Susan E. Carrie, Mountain View, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 1129 days.

(21) Appl. No.: 10/744,223

(22) Filed: Dec. 22, 2003

(51) Int. Cl.
*H04L 12/28* (2006.01)

(52) U.S. Cl. .................. 370/395.53; 370/409

(58) Field of Classification Search ................ 370/389, 370/395, 395.53, 409, 351
See application file for complete search history.

(56) References Cited

U.S. PATENT DOCUMENTS

| | | | |
|---|---|---|---|
| 5,550,816 A | | 8/1996 | Hardwick et al. |
| 5,617,421 A | * | 4/1997 | Chin et al. .................. 370/402 |
| 5,740,171 A | * | 4/1998 | Mazzola et al. ............. 370/392 |
| 6,208,649 B1 | | 3/2001 | Kloth |
| 6,665,733 B1 | * | 12/2003 | Witkowski et al. .......... 709/249 |
| 7,095,738 B1 | * | 8/2006 | Desanti ...................... 370/389 |
| 2003/0152075 A1 | * | 8/2003 | Hawthorne et al. ......... 370/389 |

OTHER PUBLICATIONS

"Simplicity and Scalability for Metro Ethernet Networks," Force 10 Networks, Inc., http://www.force10networks.com/applications/metroethernet4.asp. pp. 1-8 (2002).
"Meeting Customer Demands with Cisco Metro Ethernet Switching," Force 10 Networks, http://www.cisco.com/en/US/netsol/ns341/ns396/ns223/ns227/netbr09186a0080103de2.html, pp. 1-4 (1992).
"Virtual LAN Security Best Practices," Cisco-VLAN Security White Paper, pp. 1-13 (1992).

* cited by examiner

*Primary Examiner*—Kwang B Yao
*Assistant Examiner*—Juvena Loo
(74) *Attorney, Agent, or Firm*—Jenkins, Wilson, Taylor & Hunt, P.A.

(57) ABSTRACT

Methods and systems for selectively processing VLAN traffic from different networks while allowing flexible VLAN identifier assignment are disclosed. According to one aspect, a layer 2 switch includes a virtual switch identifier data structure that associates a VLAN identifier extracted from a layer 2 frame and a port identifier corresponding to a port on which a frame is received with a virtual switch identifier. The virtual switch identifier is used to select a per-virtual-switch data structure, such as a forwarding table. The per-virtual-switch data structure is used to control processing of the layer 2 frame on a per-virtual-switch basis. The per-virtual-switch data structure may also be updated separately from the data structures assigned to other virtual switches.

12 Claims, 9 Drawing Sheets

METHODS AND SYSTEMS FOR SELECTIVELY PROCESSING VIRTUAL LOCAL AREA NETWORK (VLAN) TRAFFIC FROM DIFFERENT NETWORKS WHILE ALLOWING FLEXIBLE VLAN IDENTIFIER ASSIGNMENT

TECHNICAL FIELD

The present invention relates to methods and systems for selectively processing VLAN traffic associated with different networks. More particularly, the present invention relates to methods and systems for selectively processing VLAN traffic from different networks while allowing flexible VLAN identifier assignment.

BACKGROUND ART

VLANs allow different physical local area networks to communicate with each other using layer 2 switches, rather than layer 3 routers. From a messaging standpoint, VLANs are implemented by inserting a VLAN identifier in a layer 2 frame. Layer 2 switches are configured to switch and control flooding of traffic based on VLAN identifiers. For example, when layer 2 traffic arrives at a switch and has a particular VLAN identifier, if a layer 2 forwarding database entry is not present in the forwarding table for the layer 2 traffic, the layer 2 traffic is only flooded onto ports of the switch associated with the same VLAN identifier. Thus, VLAN identifiers are used to control the distribution of layer 2 traffic.

One problem with using VLAN identifiers to control the distribution of layer 2 traffic occurs when different networks connected to the same layer 2 switch use the same VLAN identifiers. For example, network A may assign the VLAN identifier 23 to its layer 2 traffic. Network B may also assign the VLAN identifier 23 to its layer 2 traffic. When layer 2 frames destined for network A arrive at a layer 2 switch, if a specific layer 2 forwarding table entry does not exist for the destination in network A, the frame intended for the destination in network A will be flooded to networks A and B. Flooding traffic onto another user's network is undesirable for security reasons and it also unnecessarily wastes network bandwidth.

One solution to the problem of VLAN identifier assignment is to require different networks to use different VLAN identifiers. While assigning separate VLAN identifiers to separate networks prevents the flooding problems mentioned above, it unnecessarily limits the VLAN assignment capabilities of each network. For example, each network may desire to flexibly assign VLAN identifiers, without regard to VLAN identifiers assigned to other networks. Limiting one network to a specific VLAN identifier or set of VLAN identifiers is undesirable from a service provider perspective because it limits customers and can require customers to reconfigure their internal networks.

Another potential solution to VLAN identifier conflicts is to use a virtual metropolitan area network (VMAN) identifier in addition to VLAN identifiers to segregate traffic from different customers. The VMAN identifier may be added to layer 2 frames upon entry into a layer 2 service provider's network. The VMAN identifier is used to switch the traffic within the layer 2 service provider's network and is removed when the traffic leaves the layer 2 service provider's network. However, using VMAN identifiers still does not solve the problem of flexible VLAN assignment. For example, if two customers use the same VLAN ID, there must still be a way to segregate this traffic at the egress point of the layer 2 service provider's network. Such segregation may require that each customer be assigned to different VMAN ID upon ingress to the layer 2 service provider's network, based on some suitable criteria. Thus, while a VMAN-based solution allows traffic to be switched in a VMAN service provider's network without using VLAN IDs, there still exists a need for a solution to how to separate the traffic of different customers that use the same VLAN IDs at the ingress and egress points of the service provider's network.

Yet another potential solution to the problems of VLAN identifier assignment and traffic segregation is to use access lists to control how traffic is forwarded on different ports of a switch. For example, an access list may specify that only layer 2 traffic from a particular set of MAC source addresses can be forwarded on a particular output port, regardless of the VLAN identifier. Layer 2 access lists can thus control the traffic that is sent over each port in a layer 2 switch. However, using access lists is cumbersome because access lists must be implemented on a per-port basis and must be updated when MAC source addresses change due to equipment changes or when new machines are connected to the layer 2 switch.

U.S. Pat. No. 6,208,649 to Kloth discloses a derived VLAN mapping technique that assigns derived VLAN values based on port VLAN and either MAC address or protocol type. In particular, the '649 patent discloses that in one embodiment, the protocol type defined in the layer 2 portion of the packet can be combined with the port VLAN to select a derived VLAN. This embodiment allows packets of different protocol types, such as IP and IPX, that arrive on the same port to be sent over different output ports. However, this embodiment requires a fixed association between port and VLAN and does not address the problem of two customers desiring to assign the same VLAN identifier to different ports. If two customers use the same VLAN identifier and the same protocol type, their traffic will be mixed, according to the solution disclosed in the '649 patent. Since a layer 2 service provider should not limit the type of layer 3 traffic produced by its customers, deriving VLAN values based on protocol type is undesirable.

In the subnet-based VLAN embodiment described in the '649 patent, the IP subnet is combined with the port VLAN to determine a derived VLAN value. This embodiment allows VLANs to be divided into different IP subnets. However, this embodiment requires decoding of the IP portion of the message, which is a layer 3 function, to determine the derived VLAN. In addition, a fixed association between port and VLAN is still required.

In a third embodiment, the '649 patent discloses that an index value, rather than the port VLAN can be used to determine the derived VLAN value. The index value is disclosed as being assigned to the input port. This embodiment is undesirable because it only allows a number derived VLANs equal to the number of ports in a switch.

Accordingly, in light of the problems associated with conventional VLAN identifier assignment and traffic segregation techniques, there exists a long felt need for improved methods and systems for selectively processing VLAN traffic from different networks while allowing flexible VLAN identifier assignment.

DISCLOSURE OF THE INVENTION

The present invention includes methods and systems for selectively processing virtual local area network traffic from different networks while allowing flexible VLAN identifier assignment. According to one method, each layer 2 frame that arrives at a port of a layer 2 switch is classified according to its VLAN identifier and the port identifier. More particularly, the VLAN identifier and the port identifier are used to determine a virtual switch identifier. The virtual switch identifier is then used to select a per-virtual-switch forwarding table for processing the layer 2 frame. If a layer 2 frame with the same VLAN identifier arrives on another port, that frame can be processed differently because the combination of VLAN identifier and port identifier for that port will be assigned a different virtual switch identifier. Assigning a port identifier to VLAN traffic and using the port identifier in combination with the VLAN identifier allows customers to flexibly assign VLAN identifiers without regard to VLAN identifiers assigned to other customers. Such a solution is also more desirable than the above-referenced solutions that use protocol type, subnet, and index values to distinguish among VLANs, because customers are free to send any type of layer 3 traffic without affecting traffic distribution at the layer 2 switch.

According to another aspect, the present invention includes grouping ports of a layer 2 switch into port sets. When a layer 2 frame arrives at a particular input port, the layer 2 frame is classified to a port set. The combination of port set and VLAN identifier is then used to determine a virtual switch identifier. The virtual switch identifier is then used to select per-virtual-switch forwarding tables. Using port sets to classify incoming layer 2 frames reduces the frame classification lookup time and expense over a solution that uses the combination of port identifier and VLAN identifier. For example, a lookup table based on port ID/VLAN ID combinations and that is not divided into port sets will be much larger that a lookup table based on port sets. As a result, more memory is required, thus increasing the expense of the forwarding device.

Accordingly, it is an object of the invention to provide methods and systems for selectively processing VLAN traffic from different networks while allowing flexible VLAN identifier assignment.

It is another object of the invention to provide methods for classifying layer 2 traffic that reduce virtual switch ID lookup table size.

Some of the objects of the invention having been stated hereinabove, and which are addressed in whole or in part by the present invention, other objects will become evident as the description proceeds when taken in connection with the accompanying drawings as best described below.

BRIEF DESCRIPTION OF THE DRAWINGS

Preferred embodiments of the invention will now be explained with reference to the accompanying drawings.

DETAILED DESCRIPTION OF THE INVENTION

Figure 1:
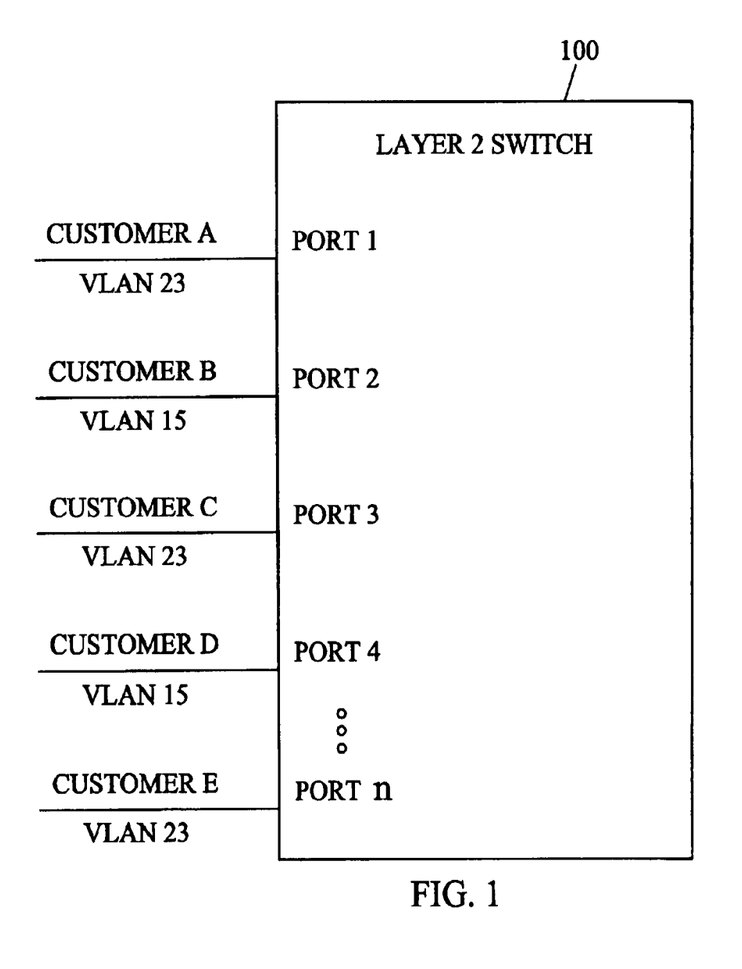
FIG. 1 is a block diagram illustrating a layer 2 network and a layer 2 switch in which embodiments of the present invention may be implemented.

FIG. 1 is a block diagram of a layer 2 switch in which the methods and systems of the present invention may be implemented. In FIG. 1, layer 2 switch 100 includes a plurality of ports numbered 1-n. As used herein, the term "port" refers to the physical point of entry for a network cable in a layer 2 switch. According to the present invention, each port in layer 2 switch 100 is assigned a port identifier. The port identifier may be added to a layer 2 frame upon entry into layer 2 switch 100. As will be described in detail below, the port identifier may be used in combination with a VLAN identifier to allow customers to flexibly assign VLAN identifiers without regard to VLAN identifiers assigned to other customers of the service provider that operates the layer 2 switch.

In the example illustrated in FIG. 1, Customer A uses VLAN identifier 23 on port 1. Customer B uses VLAN identifier 15 on port 2. Thus, traffic from Customer A on port will not be flooded to Customer B on port 2, since different VLAN identifiers are used. However, Customer C uses VLAN identifier 23 on port 3. Without the present invention or another VLAN mapping technique, layer 2 traffic from Customer A's network would be flooded onto Customer C's network and vice versa. However, according to the present invention, the port identifier is used in combination with the VLAN identifier to determine a virtual switch identifier. The virtual switch identifier is then used to select per-virtual-switch data structures, and the message is processed using the per-virtual-switch data structures. As a result, traffic associated with different customers can be isolated, even though the customers use the same VLAN ID and the customers are connected to the same layer 2 switch. It should also be noted that in FIG. 1, customers can share ports. However, the combination of port and VLAN identifier is preferably unique in the implementation illustrated in FIG. 1.

Figure 2:
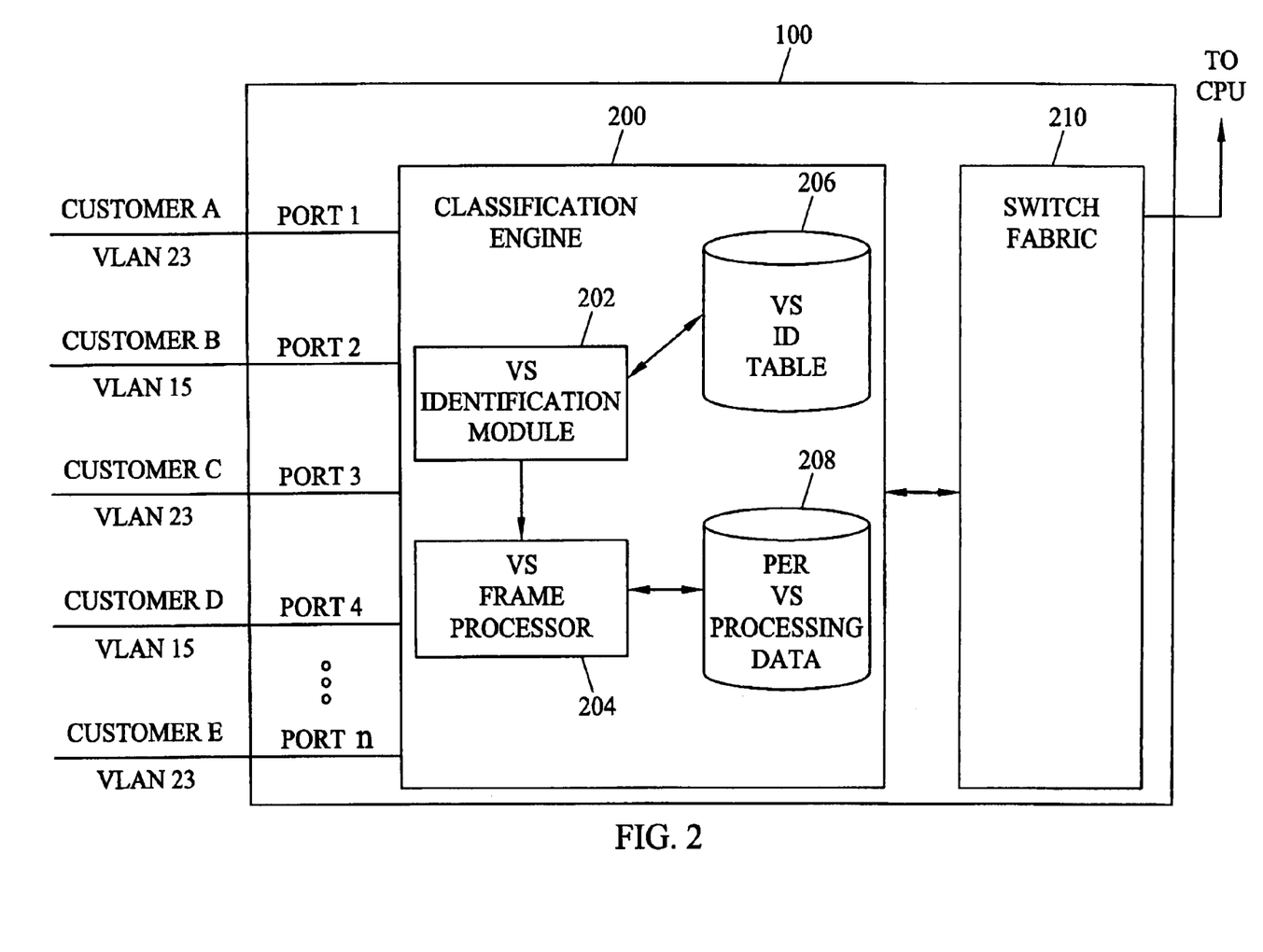
FIG. 2 is a block diagram illustrating an exemplary internal architecture of a layer 2 switch including a virtual switch identifier and per-virtual-switch message processing data structures according to an embodiment of the present invention.

FIG. 2 is a block diagram illustrating an exemplary internal architecture of layer 2 switch 100 in FIG. 1 in more detail. Referring to FIG. 2, layer 2 switch 100 includes a classification engine 200 and a switch fabric 202. Classification engine 200 performs packet classification functions, such as determining the output port to which a packet should be forwarded, determining the quality of service that should be given to a packet, determining output ports to which a packet should be flooded, etc. In the present embodiment, classification engine 200 includes a virtual switch identification module 202 for identifying a virtual switch for each incoming layer 2 frame and a virtual switch frame processor 204 for processing incoming frames based on the virtual switch identifier. In addition, classification engine 200 includes a virtual switch identification table 206 containing data for identifying a virtual switch for each incoming packet and per-virtual-switch processing data 208 for processing frames according to the identified virtual switch. Table 206 may be indexed based on port identifiers and VLAN identifiers, as described above. In an alternate implementation, table 206 may be indexed based on port identifier if all VLANs on a particular port are assigned to the same virtual switch. In such an implementation, if it is determined that all VLANs on a particular port are not assigned to a virtual switch, virtual switch ID table 206 may be accessed based on VLAN identifier. In yet another alternate implementation, virtual switch ID table 206 may be indexed based on VLAN identifier and port set identifier. In yet another alternate implementation, combinations of these indexing methods may be used. Each of these indexing methods will be described in more detail below.

Per-virtual-switch processing data 208 may include a layer 2 forwarding database for each virtual switch. In addition, per-virtual switch processing data 208 may include per-virtual-switch address resolution protocol (ARP) caches and per-virtual-switch spanning tree data. Switch fabric 202 switches frames between input and output ports. In addition, switch fabric 202 may forward frames that require additional processing to a CPU.

Figure 3:
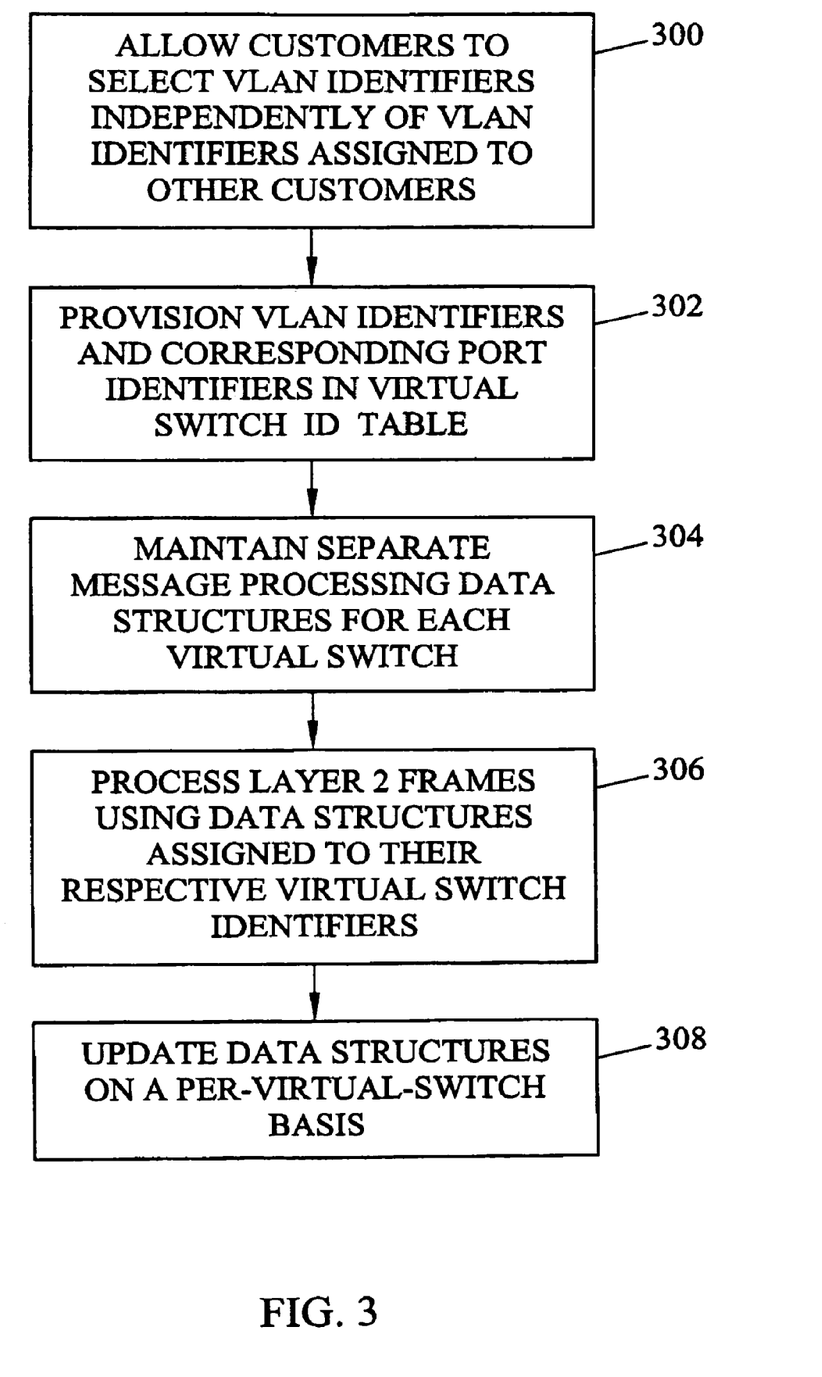
FIG. 3 is a flow chart illustrating exemplary steps for selectively processing layer 2 traffic from different networks while allowing flexible VLAN identifier assignment according to an embodiment of the present invention.

FIG. 3 is a flow chart illustrating the overall steps performed in allowing users to flexibly assign VLAN identifiers and in selectively processing packets in a level 2 switch that allows such flexible assignments. Referring to FIG. 3, in step 300, customers are allowed to select VLAN identifiers independently of VLAN identifiers assigned to other customers. As used herein, the term "customers" refers consumers of layer 2 services who are connected to the same layer 2 switch. Because the present invention allows such customers to select VLAN identifiers independently of VLAN identifiers assigned to other customers, provided the customers are connected to different ports, the level 2 service provider does not constrain customer VLAN selection.

In step 302, the VLAN identifiers and the corresponding port identifiers are provisioned in the virtual switch ID table. As stated above, each unique combination of VLAN identifier and port identifier may be assigned to a virtual switch. In step 304, separate message processing data structures are maintained for each virtual switch. These message processing data structures may include layer 2 forwarding databases, ARP caches, and spanning tree data. It is important to maintain separate forwarding databases and ARP caches to prevent frames intended for one VLAN from being sent over another VLAN. In addition, MAC address learning, ARP broadcasting, forwarding of spanning tree bridge protocol data units are preferably also limited to each virtual switch to prevent machine addresses in one network from being learned by another network.

Accordingly, in step 306, layer 2 frames are processed using data structures assigned to their respective virtual switch identifiers. In step 308, data structures, such as forwarding databases, spanning tree data, and ARP caches are updated on a per-virtual-switch basis. This updating may occur based on MAC address learning, ARPing, or participating in spanning tree protocols on a per virtual switch basis.

Using the steps illustrated in FIG. 3, a plurality of different functions can be performed on a per-virtual-switch basis, which increases security and flexibility in VLAN assignment. Examples of such per-virtual-switch functions are as follows:

1) Layer 2 bridging: Separate sets of layer 2 forwarding databases are maintained for each virtual switch. The incoming virtual switch index is used to select the correct set of entries.

2) Layer 2 MAC address learning: The virtual switch index associated with a received layer 2 frame containing a new MAC source address is used to limit forwarding database updates to the set of layer 2 forwarding database entries associated with that virtual switch. Using standard MAC protocols, when a layer 2 frame with a new MAC source address is received, the layer 2 forwarding database used for traffic on all ports is updated. If VLANs are used, updates can be limited to per-VLAN forwarding tables. However, if customers use the same VLAN identifiers, forwarding tables for each network that uses the same VLAN identifier will be updated. As a result, any layer 2 frame that is addressed to the learned MAC source address will be forwarded to that MAC source address even if the layer 2 frame is from a different network.

The present invention eliminates this problem by limiting such learning to a per-virtual-switch basis. For example, when a layer 2 frame with a new MAC source address is received, only the forwarding data corresponding to the virtual switch assigned to the received frame is updated. As a result, VLAN traffic from different networks will be segregated and security will be enhanced.

3) Layer 2 flooding: In conventional layer 2 networks, if a frame is received for which no entry exists in the layer 2 forwarding database, the packet is flooded on all ports. VLAN identifiers have been used to constrain such flooding to ports that are associated with the same VLAN. However, as discussed above, if two service providers use the same VLAN identifier, frames intended for one service provider may be flooded onto the network of the other service provider.

The present invention avoids this difficulty by limiting such flooding to a per-virtual-switch basis, even when two customers have the same VLAN identifier. For example, when a layer 2 frame is received, the virtual switch identifier is determined and used to access the forwarding data for that virtual switch. If a forwarding database entry for the received MAC destination address does not exist, the frame is flooded only onto ports associated with the same virtual switch. As a result, security is increased and network bandwidth is more efficiently utilized.

4) ARPing: Using the standard address resolution protocol or ARP, when an IP packet arrives, an ARP cache containing IP to physical address mappings from recent ARP requests is accessed to determine the MAC address corresponding to the IP address. If the ARP cache does not contain an entry corresponding to the IP address, the machine that received the packet will broadcast an ARP request on all ports. The ARP request includes the IP address and MAC address of the sender so that all of the receiving machines can update their ARP caches with that information. The machine that has the particular IP address responds with its MAC address.

5) Proxy ARPing: Proxy ARP is a refinement to the ARP protocol that allows a single IP network prefix to correspond to two different physical addresses on different networks. For example, a router may interconnect two networks that share an IP address. When a machine on network A desires to contact a machine on network B, the machine on network A may send an ARP request to the router. The router responds with its own physical address, proxying the ARP request for the machine on network B. Machine A receives the ARP reply, sends packet to the router, and the router forwards the packet to the machine on network B. The router must maintain mappings of which machines lie on which network in order to properly route packets. Thus, proxy ARP allows two different physical networks to appear as a single network. The present invention preferably maintains proxy ARP data on a per virtual switch basis to ensure that conflicts between networks do not occur if different networks use the same IP addresses.

If ARP requests and replies are sent to networks of different customers, customers on one network can learn IP and physical addresses assigned to other networks. Such cross-customer address learning may be undesirable for security reasons.

The present invention avoids these difficulties by limiting, ARPing and maintaining separate ARP caches for each virtual switch. In other words, ARP requests are only sent to machines associated with the same virtual switch as the sending node. In addition, ARP caches are maintained on a per-virtual-switch basis. As a result, customers will only have access to IP to physical address mappings in their own networks.

6) Spanning Tree Protocol (STP): Yet another data structure that may be maintained on a per-virtual-switch basis is spanning tree data. Spanning tree data includes layer 2 topology and root node information maintained by each node. This data is used to detect and prevent looping. It is undesirable for security reasons and inefficient for STP data to be shared by different networks. For example, a spanning tree bridge protocol data unit (BPDU) may include all of a sender's MAC source addresses, ports, and path costs from each port to the root switch. Such data units are distributed to all switches in a LAN and used to build a spanning tree for the LAN. If VLANs are used, spanning tree data can be shared among switches in the same VLAN. However, if VLAN conflicts occur, spanning tree data will be shared across networks, causing security problems and wasting network bandwidth.

The present invention avoids this problem by maintaining spanning tree data on a per-virtual-switch basis and limiting spanning tree BPDU distribution to switches within the same virtual switch. For example, when a spanning tree BPDU is received, a virtual switch identifier is determined based on the port and VLAN IDs. Spanning tree data is then updated only for that virtual switch. Similarly, when spanning tree BPDUs are sent, they only include information regarding ports associated with the same virtual switch as the sending virtual switch and are only sent on ports associated with that virtual switch. By maintaining per-virtual-switch spanning trees, network security is increased and bandwidth is more efficiently utilized.

Virtual Switch Identifier Lookup Variations

Figure 4:
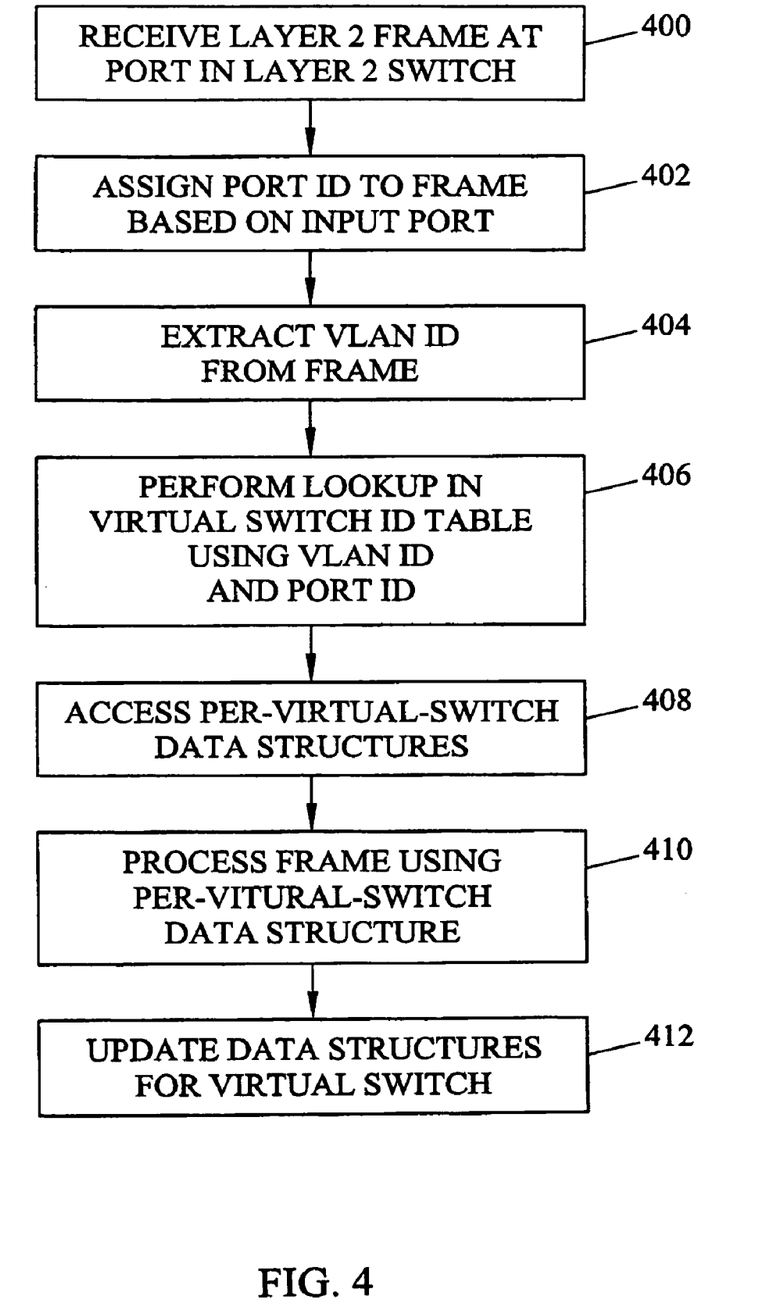
FIG. 4 is a flow chart illustrating exemplary steps for classifying and processing layer 2 frames based on port identifier and VLAN identifier according to an embodiment of the present invention.

As stated above, in one implementation of the invention, a virtual switch identifier may be determined by performing a lookup based on a combination of full port identifier and VLAN identifier. FIG. 4 is a flow chart illustrating exemplary steps that may be performed in assigning virtual switch identifiers based on full port identifiers and VLAN identifiers and selectively processing the frames using such identifiers. Referring to FIG. 4, in step 400, a layer 2 frame is received at a port of a layer 2 switch. In step 402, a port identifier is assigned to the layer 2 frame. In step 404, the VLAN identifier is extracted from the layer 2 frame. In step 406, a lookup is performed in the virtual switch identifier table using the VLAN ID and the port ID combination. The virtual switch identifier is extracted and, in step 408, a per-virtual-switch data structure is accessed. Such data structures may include forwarding databases, ARP caches, etc. In step 410, the frame is processed using the per-virtual-switch data structure. For example, the frame may be forwarded or flooded to a node or nodes associated with the same virtual switch. In step 412, the per-virtual-switch data structures are updated.

Thus, using the steps illustrated in FIG. 4, frames can be selectively processed and data structures can be selectively updated based on the combination of VLAN ID and port ID. While this solution provides the greatest flexibility in terms of end user VLAN ID selection, it can result in a large virtual switch ID table size. For example, in a layer 2 switch that includes 2048 ports and the VLAN ID is 12 bits, the resulting virtual switch ID table size is 2048*4096=8M table entries. If it is desirable to reduce the table size, some input ports may be assigned to a single virtual switch and the VLAN ID may be used to determine the virtual switch ID for other ports. In this solution, the virtual switch ID table size is reduced to 2048 ports+4096 VLANs=6144 table entries. This decrease in lookup table size is at the expense of flexibility in VLAN identifier assignment. For example, on ports for which all VLANs are not assigned to the same virtual switch, two service providers cannot use the same VLAN ID. However, the number of available virtual switch identifiers is 6144 versus 4096 if the VLAN ID is used alone.

Figure 5:
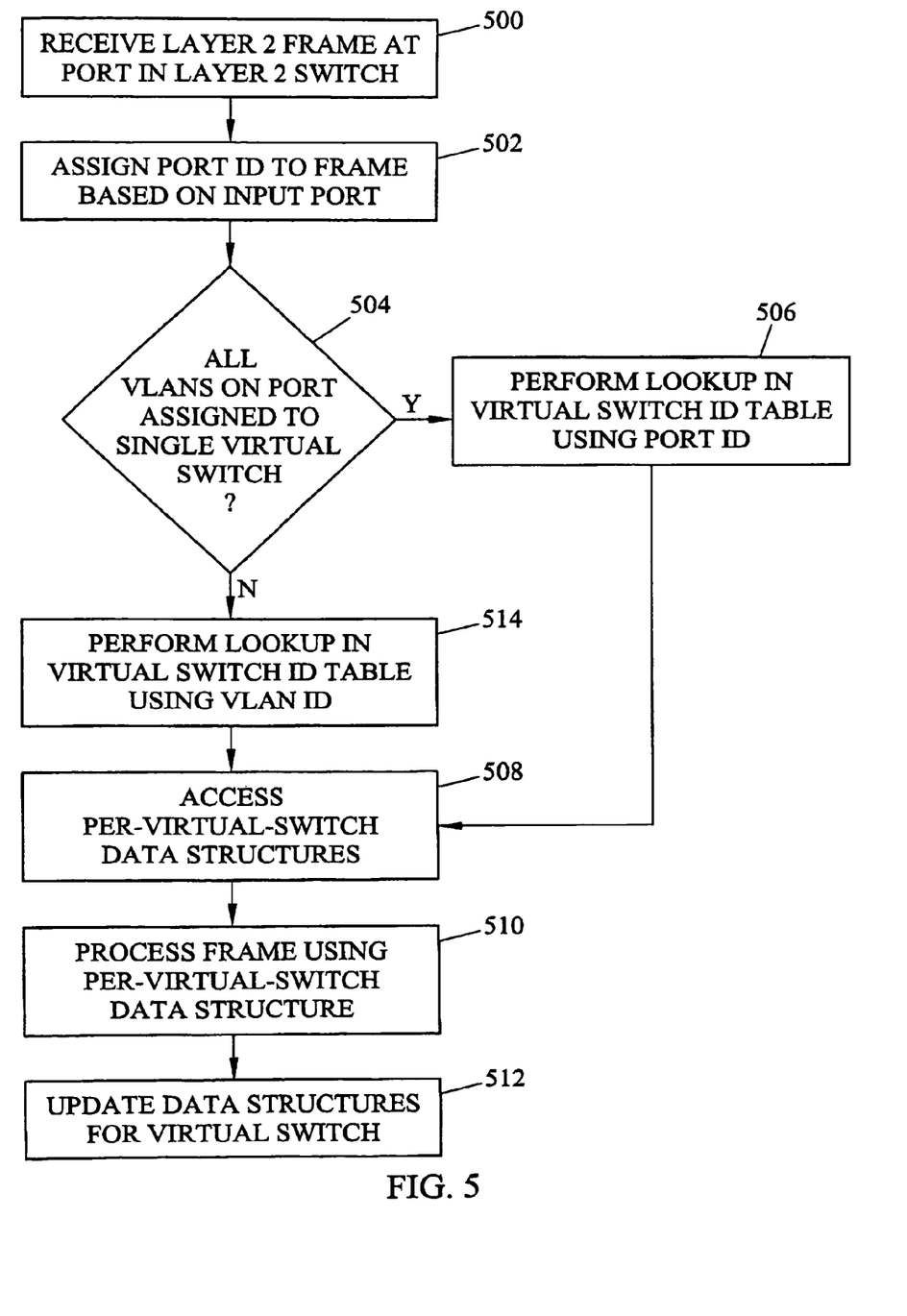
FIG. 5 is a flow chart illustrating exemplary steps for classifying and processing layer 2 frames based on port identifier or VLAN identifier according to an embodiment of the present invention.

FIG. 5 is a flow chart illustrating exemplary steps that may be performed by a layer 2 switch in assigning virtual switch identifiers using the port-based or VLAN-based virtual switch assignment scheme described above. Referring to FIG. 5, in step 500, the layer 2 switch receives a layer 2 frame at one of its ports. In step 502, the layer 2 switch assigns a port ID to the frame based on the input port. In step 504, the layer 2 switch determines whether the port is assigned to a single virtual switch. If the port is assigned to a single virtual switch, control proceeds to step 506 where a lookup is performed in the virtual switch identifier table using the port ID. The virtual switch identifier corresponding to the port identifier is extracted. Control then proceeds to steps 508 through 512 where the per-virtual-switch data structures are accessed, the frame is processed using the per-virtual-switch data structures, and the data structures for the virtual switch are updated.

Returning to step 504, if the port is not assigned to a single virtual switch, control proceeds to step 514 where a lookup is performed in the virtual switch ID table using the VLAN ID. Control then proceeds to step 508 through 512 where the frame is processed using per-virtual-switch processing data and the data is updated.

Figure 6:
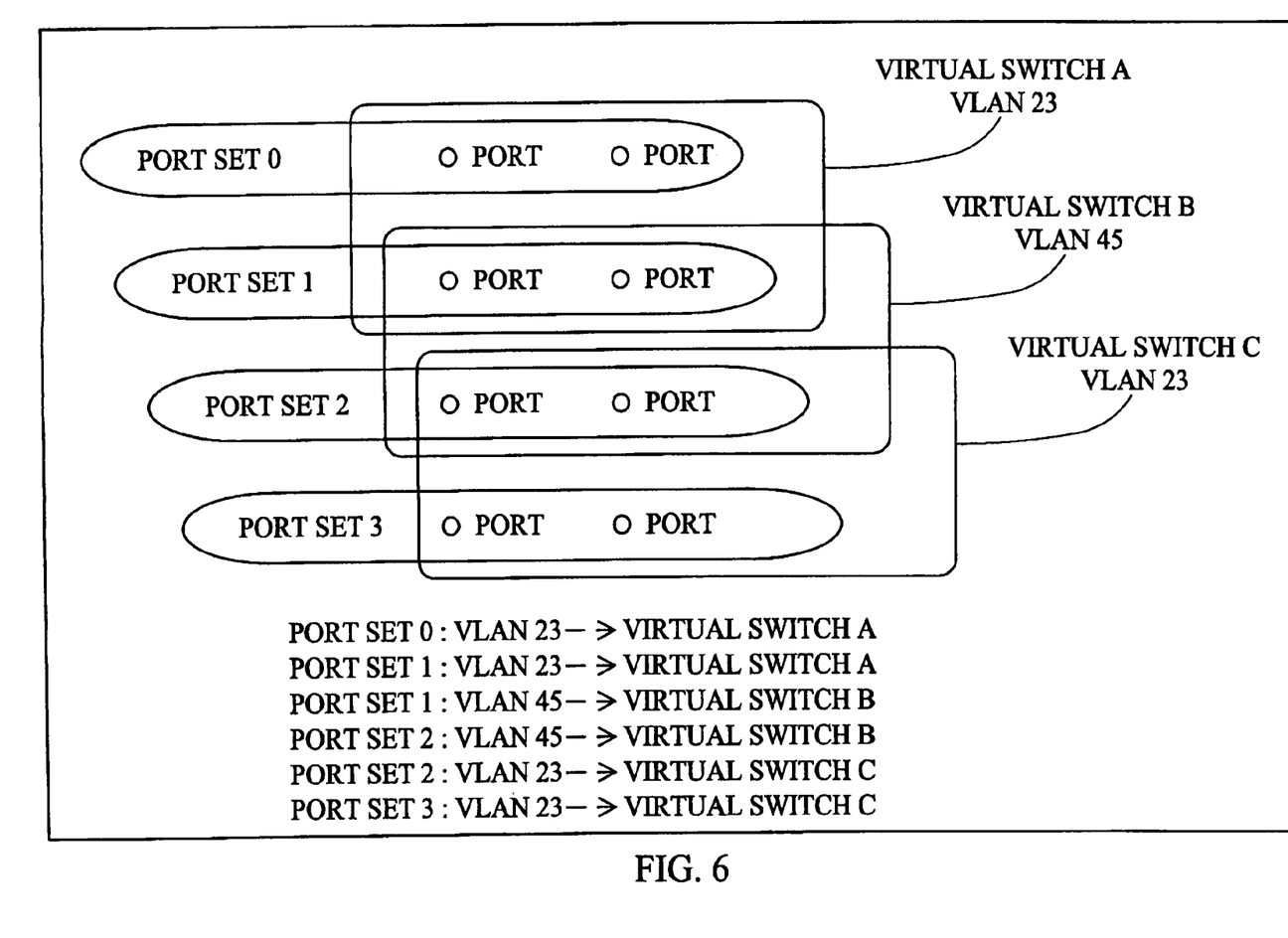
FIG. 6 is a block diagram illustrating exemplary grouping of ports into port sets in a layer 2 switch according to an embodiment of the present invention.

In yet another alternate implementation of the invention, the virtual switch identifier may be determined using a hierarchical approach based on a port set identifier. FIG. 6 is block diagram illustrating the port set identifier concept. In FIG. 6, the ports on a layer 2 switch are assigned to port sets 0, 1, 2, and 3. Each combination of port set and VLAN identifier is then assigned to a virtual switch. By partitioning the layer 2 switch into port sets, ports can be shared among different customers, provided that the customers are assigned different port set-VLAN ID combinations. For example, in FIG. 6, virtual switch A may be assigned to Customer A, virtual switch B may be assigned to Customer B, and virtual switch C may be assigned to Customer C. Customers A and B can both use the ports in port set 1, because Customers A and B use different VLAN identifiers. However, Customers A and C cannot use the same ports because Customers A and C use the same VLAN identifiers.

Figure 7:
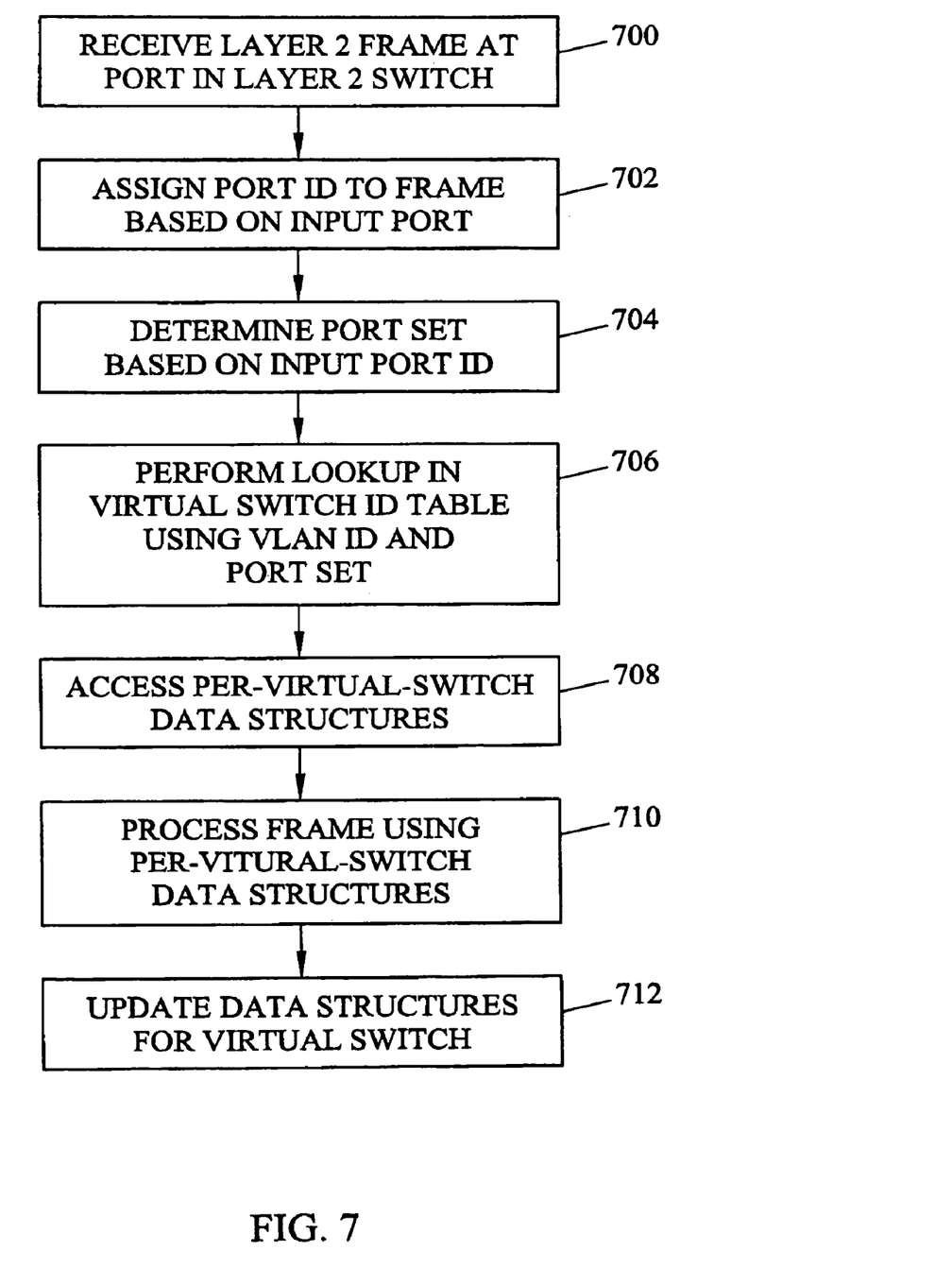
FIG. 7 is a flow chart illustrating exemplary steps for classifying and processing layer 2 frames based on port identifiers, VLAN identifiers, and port set identifiers according to an embodiment of the present invention.

FIG. 7 is a flow chart illustrating exemplary steps for selecting virtual switch identifiers based on port set identifiers and VLAN identifiers and processing frames using the virtual switch identifiers. Referring to FIG. 7, in step 700, the layer 2 switch receives a layer 2 frame at one of its ports. In step 702, the switch assigns a port ID to the frame based on the port on which the layer 2 frame was received. In step 704, a port set is determined based on the port ID. As discussed above, the ports may be grouped into port sets to reduce the lookup table size.

In step 706, a lookup is performed in the virtual switch ID table using the VLAN ID and the port set identifier. Once the virtual switch ID is determined, in step 708, 710, and 712, the frame is processed using the per-virtual-switch data structures and the data structures are updated. Thus, by performing a hierarchical lookup based on port set ID, the present invention reduces the virtual switch ID lookup table size yet still provides flexibility in VLAN identifier assignment.

Figure 8:
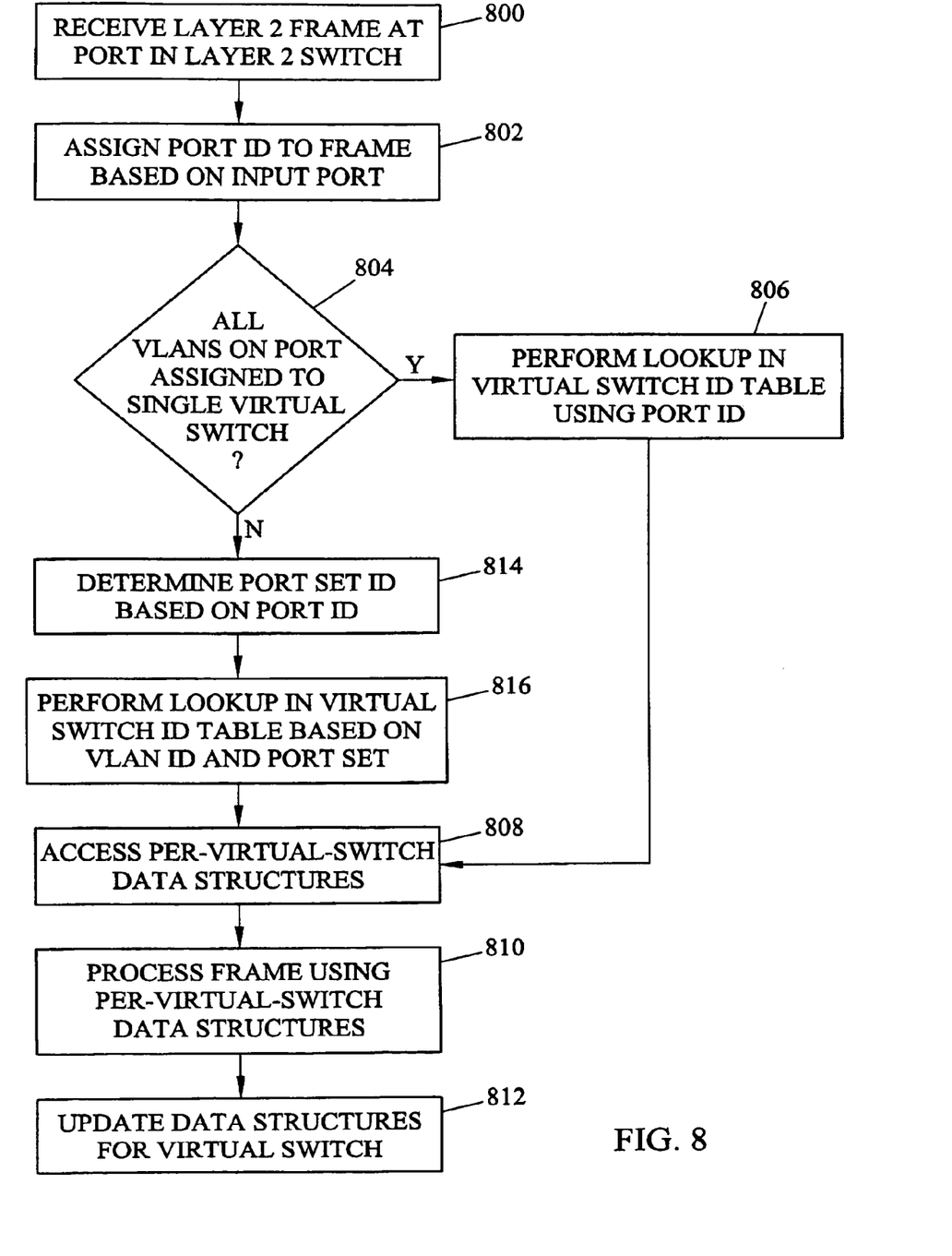
FIG. 8 is a flow chart illustrating exemplary steps for classifying and processing layer 2 frames that combines the embodiments illustrated in FIGS. 5-7.

In yet another alternate implementation of the invention, the hierarchical lookup in FIG. 7 can be combined with the method illustrated in FIG. 5. FIG. 8 is a flow chart illustrating this combination of processing steps according to an embodiment of the present invention. Referring to FIG. 8, in step 800, a layer 2 frame is received at a port in a layer 2 switch. In step 802, a port ID is assigned to the frame based on the input port. In step 804, it is determined whether all VLANs on the port are assigned to the same virtual switch. If all VLANs on the port are assigned to the same virtual switch, control proceeds to step 806 where the virtual switch ID table is accessed using the port ID. Control then proceeds to steps 808 through 812 where the frame is processed using the per-virtual-switch data structures and the data structures for that virtual switch are updated.

Returning to step 804, if all VLANs on the port are not assigned to the same virtual switch, control proceeds to step 814 where the port set ID is determined using the port ID. As discussed above, ports may be grouped into port sets to reduce the size of the virtual switch ID table. In step 816, a lookup is performed in the virtual switch ID table based on the VLAN ID and the port set ID. Once the virtual switch identifier is determined, control proceeds to steps 808 through 812 where the frame is processed using per-virtual-switch data and the corresponding data structures are updated.

Figure 9:
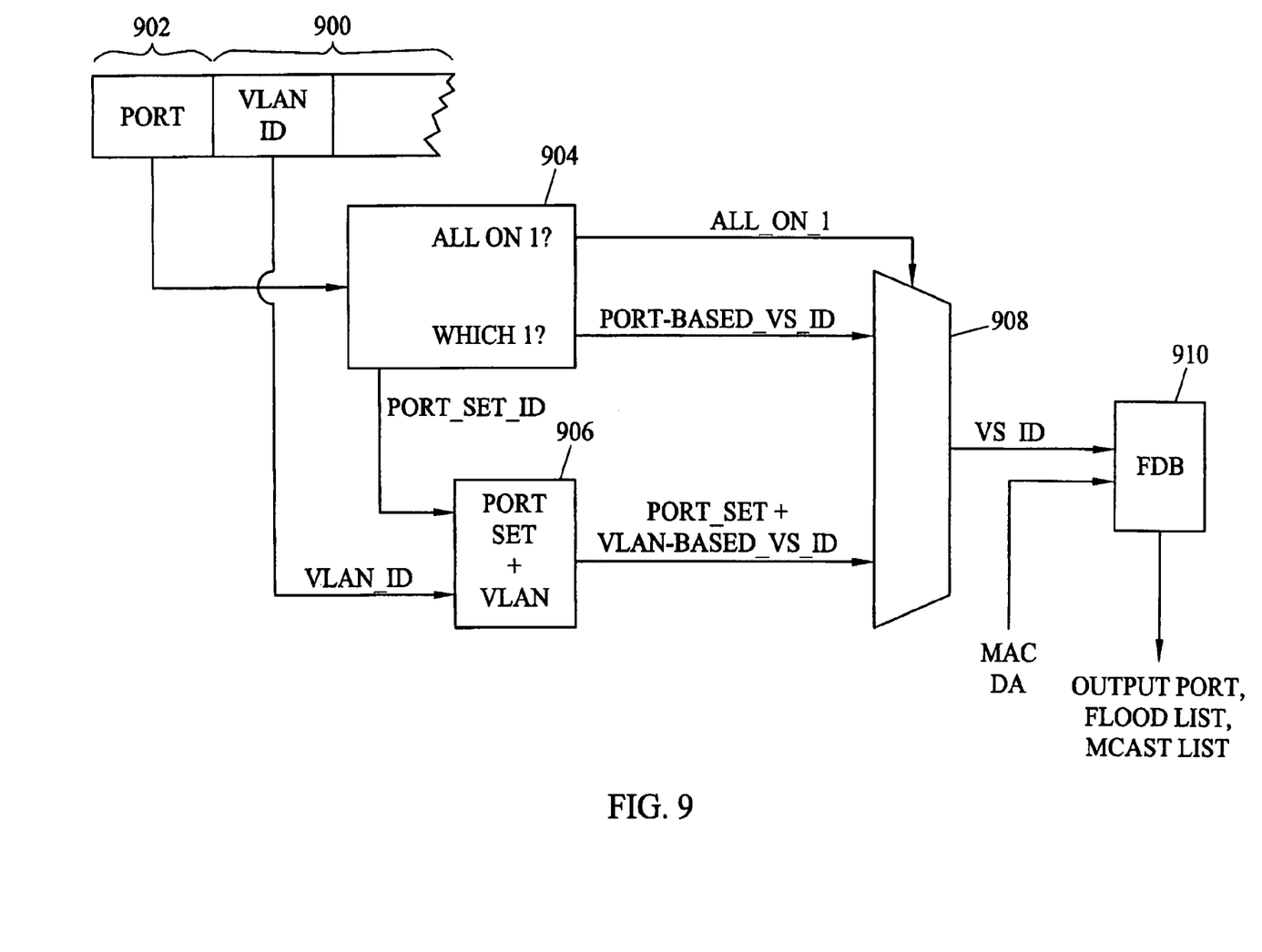
FIG. 9 is a block diagram illustrating an exemplary hardware implementation of the steps illustrated in FIG. 8.

Any of the virtual switch ID lookup methods described with respect to FIGS. 4-8 may be implemented in hardware, software, firmware or any combination thereof. FIG. 9 is a block diagram illustrating a hardware implementation of the combined lookup method described with regard to FIG. 8. It is understood that portions of the hardware illustrated in FIG. 9 may also be used to implement the processing steps illustrated in any of FIGS. 4, 5, 7, and 8. Referring to FIG. 9, a received layer 2 frame 900 is assigned a port identifier 902 upon entry into a layer 2 switch. The port identifier may be added to the frame. Decision block 904, which may be implemented using a lookup table or content-addressable memory (CAM), receives the port identifier as input and produces a first output signal indicating whether or not all VLANs on the port are assigned to the same virtual switch. If all VLANs on the same port are assigned to the virtual switch, block 904 also outputs a port-based virtual switch ID. If all VLANs on a port are not assigned to the same virtual switch, block 904 determines a port set ID based on the port ID.

Block 906, which may be implemented using a lookup table or CAM, receives as input the port set ID and the VLAN ID and outputs a port set and VLAN-based virtual switch ID. The signals port-based_VS_ID and PORT_SET+VLAN-based_VS_ID are input into multiplexer 908. The signal all_on_1 is used to select the input of multiplexer 908 that will be coupled to the output port. For example, if the selector input all_on_1 indicates that all VLANs on a particular port are assigned to the same virtual switch, the output signal VS_ID is equal to the port-based_VS_ID input signal. If the signal all_on_1 indicates that all VLANs on a particular port are not assigned to the same virtual switch, the signal PORT_SET+VLAN-BASED_VS_ID is coupled to the output port.

The output of multiplexer 908, which is the virtual switch ID, is input into forwarding database 910. Forwarding database 910 also receives as input the MAC destination address. Using the virtual switch ID in combination with the MAC destination address allows the portion of forwarding database 910 that is specific to the virtual switch to be selected. It is understood that forwarding database 910 may include separate lookup tables for each virtual switch or separate blocks of data for each virtual switch. Any organization of data on a per-virtual-switch basis is intended to be within the scope of the invention. The output of forwarding database 910 may be an output port, a flood list, or a multicast list, depending on the output of the lookup.

Thus, the present invention includes methods and systems that allow frames associated with different VLANs to be selectively processed while allowing flexible customer VLAN identifier assignment. The present invention uses the combination of port ID and VLAN ID to determine a virtual switch identifier for each incoming frame. The frames are then processed on a per-virtual-switch basis and data structures are maintained and updated on a per-virtual-switch basis. The present invention also includes various virtual switch identifier lookup methods and data structures for decreasing virtual switch ID lookup time.

The present invention is not limited to expressly identifying a virtual switch based on port/VLAN or port set/VLAN combination. It is understood that the combination of identifiers can be used to implicitly identify a virtual switch and select the appropriate data structures without departing from the scope of the invention.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for selectively processing virtual local area network (VLAN) traffic from different networks while allowing flexible VLAN identifier assignment, the method comprising:

(a) receiving, from a first network, a first layer 2 frame at a first port in a layer 2 switch, the first layer 2 frame having a first VLAN identifier;

(b) associating a first port identifier corresponding to the first port with the first layer 2 frame;

(c) determining a first virtual switch based on the combination of the first port identifier and the first VLAN identifier, wherein the first virtual switch is associated with a first message processing data structure;

(d) selectively processing the first layer 2 frame using the first message processing data structure associated with the first virtual switch without modifying the first VLAN identifier;

(e) receiving, from a second network, a second layer 2 frame at a second port in the layer 2 switch, the second layer 2 frame having the first VLAN identifier;

(f) associating a second port identifier corresponding to the second port with the second layer 2 frame;

(g) determining a second virtual switch based on the combination of the second port identifier and the first VLAN identifier, wherein the second virtual switch is associated with a second message processing data structure being separate from the first message processing data structure; and (h) selectively processing the second layer 2 frame using the second message processing data structure associated with the second virtual switch without modifying the first VLAN identifier, wherein selectively processing the second layer 2 frame includes processing the second layer 2 frame differently from the first layer 2 frame.

2. The method of claim 1 wherein selectively processing the first and second layer 2 frames includes preventing the first layer 2 frame from being forwarded to the second network and preventing the second layer 2 frame from being forwarded to the first network.

3. The method of claim 2 wherein preventing the first layer 2 frame from being forwarded to the second network and preventing the second layer 2 frame from being forwarded to the first network includes maintaining separate forwarding databases for the first and second virtual switches.

4. The method of claim 1 wherein associating first and second port identifiers with the first and second layer 2 frames includes adding the first and second port identifiers to the first and second layer 2 frames upon entry into the layer 2 switch.

5. The method of claim 1 wherein the layer 2 switch includes a plurality of ports and wherein the method further comprises assigning all VLANs on at least one of the ports to the same virtual switch.

6. A method for selectively processing virtual local area network (VLAN) traffic from different networks while allowing flexible VLAN identifier assignment, the method comprising:

(a) receiving, from a first network, a first layer 2 frame at a first port in a layer 2 switch, the first layer 2 frame having a first VLAN identifier;

(b) associating a first port identifier corresponding to the first port with the first layer 2 frame;

(c) assigning the first layer 2 frame to a first virtual switch based on the first port identifier and the first VLAN identifier, wherein assigning the first layer 2 frame to the first virtual switch includes determining whether all VLANs on the first port are associated with the same virtual switch, wherein the first virtual switch is associated with a first message processing data structure;

(d) selectively processing the first layer 2 frame using the first message processing data structure associated with the first virtual switch without modifying the first VLAN identifier;

(e) receiving, from a second network, a second layer 2 frame at a second port in the layer 2 switch, the second layer 2 frame having the first VLAN identifier;

(f) associating a second port identifier corresponding to the second port with the second layer 2 frame;

(g) assigning the second layer 2 frame to a second virtual switch based on the second port identifier and the first VLAN identifier, wherein the second virtual switch is associated with a second message processing data structure being separate from the first message processing data structure; and (h) selectively processing the second layer 2 frame using the second message processing data structure associated with the second virtual switch without modifying the first VLAN identifier, wherein selectively processing the second layer 2 frame includes processing the second layer 2 frame differently from the first layer 2 frame; and (i) wherein the layer 2 switch includes a plurality of ports and wherein the method further comprises assigning all VLANs on at least one of the ports to the same virtual switch.

7. The method of claim 6 wherein determining a first virtual switch includes, in response to determining that all VLANs on the first port are not associated with the same virtual switch, identifying the first virtual switch using the first port using the first VLAN identifier.

8. The method of claim 1 wherein the layer 2 switch includes a plurality of ports and wherein the method further comprises grouping the ports into port sets.

9. The method of claim 8 wherein determining a first virtual switch includes determining a port set identifier corresponding to the first port identifier and identifying the first virtual switch using the port set identifier and the first VLAN identifier.

10. The method of claim 1 wherein the layer 2 switch includes a plurality of ports and wherein the method further comprises assigning all VLANs associated with some of the ports with the same virtual switch and grouping the ports into port sets.

11. A method for selectively processing virtual local area network (VLAN) traffic from different networks while allowing flexible VLAN identifier assignment, the method comprising:

(a) receiving, from a first network, a first layer 2 frame at a first port in a layer 2 switch, the first layer 2 frame having a first VLAN identifier;

(b) associating a first port identifier corresponding to the first port with the first layer 2 frame;

(c) assigning the first layer 2 frame to a first virtual switch based on the first port identifier and the first VLAN identifier, wherein the layer 2 switch includes a plurality of ports, wherein the first virtual switch is associated with a first message processing data structure, wherein the method further comprises assigning all VLANs associated with some of the ports with the same virtual switch and grouping the ports into port sets and wherein assigning the first layer 2 frame to the first virtual switch includes:

(ii) determining whether all VLANs on the first port are assigned to the same virtual switch;

(iii) in response to determining that all VLANs on the first port are not assigned to the same virtual switch, determining a port set identifier corresponding to the first port identifier; and (iv) identifying the first virtual switch using the port set identifier and the first VLAN identifier;

(d) selectively processing the first layer 2 frame using the first message processing data structure associated with the first virtual switch without modifying the first VLAN identifier;

(e) receiving, from a second network, a second layer 2 frame at a second port in the layer 2 switch, the second layer 2 frame having the first VLAN identifier;

(f) associating a second port identifier corresponding to the second port with the second layer 2 frame;

(g) assigning the second layer 2 frame to a second virtual switch based on the second port identifier and the first VLAN identifier, wherein the second virtual switch is associated with a second message processing data structure being separate from the first message processing data structure; and (h) selectively processing the second layer 2 frame using the second message processing data structure associated with the second virtual switch without modifying the second first VLAN identifier, wherein selectively processing the second layer 2 frame includes processing the second layer 2 frame differently from the first layer 2 frame.

12. The method of claim 1 wherein the first and second networks are associated with different end users.

* * * * *